June 11, 1968 E. S. LEE III 3,388,382

MEMORY SYSTEM

Filed Dec. 13, 1963 2 Sheets-Sheet 1

INVENTOR
EDWIN S. LEE, III
BY
Christie, Parker & Hale
ATTORNEYS.

INVENTOR.
EDWIN S. LEE, III
BY
Christie, Parker & Hale
ATTORNEYS.

United States Patent Office 3,388,382

Patented June 11, 1968

3,388,382

MEMORY SYSTEM

Edwin S. Lee III, West Covina, Calif., assignor to Burroughs Corporation, Detroit, Mich., a corporation of Michigan Filed Dec. 13, 1963, Ser. No. 330,336
11 Claims. (Cl. 340—172.5)

Figure 1:
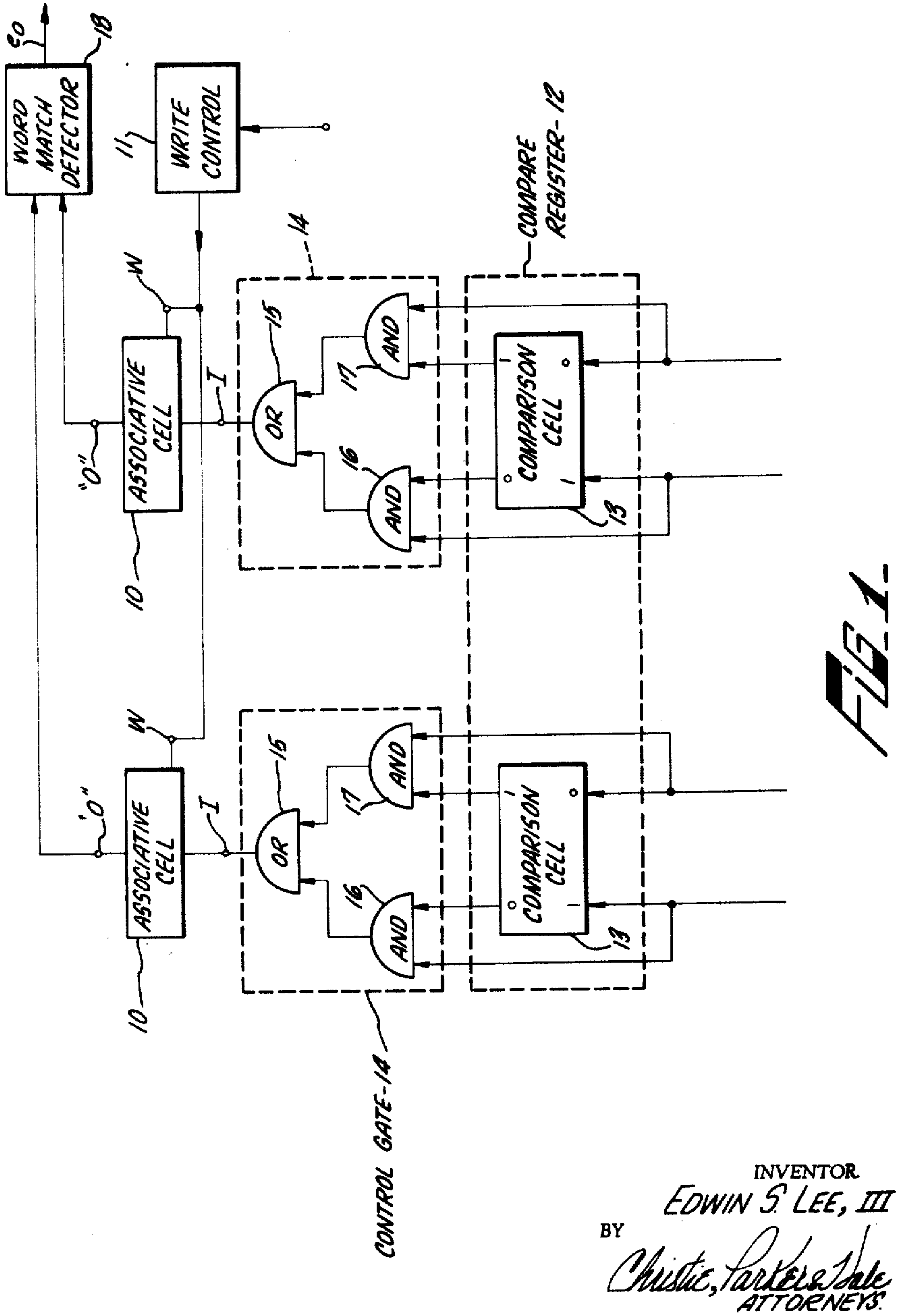

This invention relates to memory systems and, more particularly, to improved associative memory systems.

This application is an improvement over my earlier filed application entitled, "Memory System," bearing Ser. No. 236,310, filed on Nov. 8, 1962, and assigned to the same assignee as the present invention.

The associative memory system described in my aforementioned patent application utilized a complementing bistable element as the associative memory element. In the associative memory technique described in that application the complementing bistable element required a two phase system for proper operation, that is, two clock pulses were necessary to define the two phases. As a result the comparison operations could only be performed while the system was in phase 2, while the compare register had to be loaded while the system was in phase 1. The access time of such a complementing flip-flop associative memory was, then, the time required to load the slowest cell of the compare register plus the time during which a subsequent clock pulse occurred in addition to the time required for final settling out of the system. It was necessary to utilize the second clock pulses in my earlier system in order to reset or regenerate the information in the associative memory cells after a comparison had been effected to prepare the memory for the next operation.

The present invention provides an improved associative memory system employing a complementing bistable element but which system does not require any clock pulses to effect a comparison. With the logic of the present invention the comparison is effected by the time that the information undergoing comparison is stored or finally settled out in the comparison register. This, then, eliminates the time required to load the comparison register which was an important factor in the access time of the earlier system.

From a method standpoint, the present invention is broadly directed to the electronic comparing of two binary words arranged in two binary registers. The registers each store the binary bits of the two words in individual cells and which cells produce binary output indications representing the storage state thereof and normally being arranged in one of the states. The binary words to be compared are sequentially written into the registers. The binary state of the individual cell of one of the registers is changed or complemented only when the corresponding cell of the other register is changed from either its initial state, i.e., a binary zero, or with each subsequent change in binary state thereafter. The binary states of the individual cells of the one register which are controlled in accordance with the binary states of the cells of the other register are examined to determine whether a matching or mismatching relationship exists between the two words undergoing comparison.

From a structural standpoint, the associative memory system comprises a plurality of bistable elements arranged in rows and columns for storing the individual bits of the binary word in separate binary cells. The binary cells preferably are characterized as having an input means for complementing the binary state of the individual cells. The comparison register comprises a plurality of binary cells for storing the binary bits of a word undergoing comparison. A control gate is connected between each binary cell of the compare register and the corresponding binary cells for each word in the binary storage registers to control the complementing of the binary storage cells of the words in the memory proper. The control gate is defined whereby it is effective to complement the binary cells storing the corresponding binary bits of the words stored in the memory under certain conditions. This is effected by the gate examining the state of the comparison cell in combination with the input signals being delivered to the same comparison cell of the comparison register to cause the corresponding storage binary cells to be complemented when the comparison cell is changed from its initial state, or after it has once been switched from its initial state, with each subsequent change of binary state thereafter. Upon the termination of the loading of the compare register, the associative cells of the memory proper will indicate a binary state corresponding to whether there is a match or mismatch between the corresponding bits of the memory words and the word stored in the comparison register. Accordingly, upon examining the state of each associative cell of the same binary word by means of a match detector, an indication of the matching or mismatching relationship between each word in the memory and the word in the comparison cell may be had by the time the comparison register has been loaded.

Figure 2:
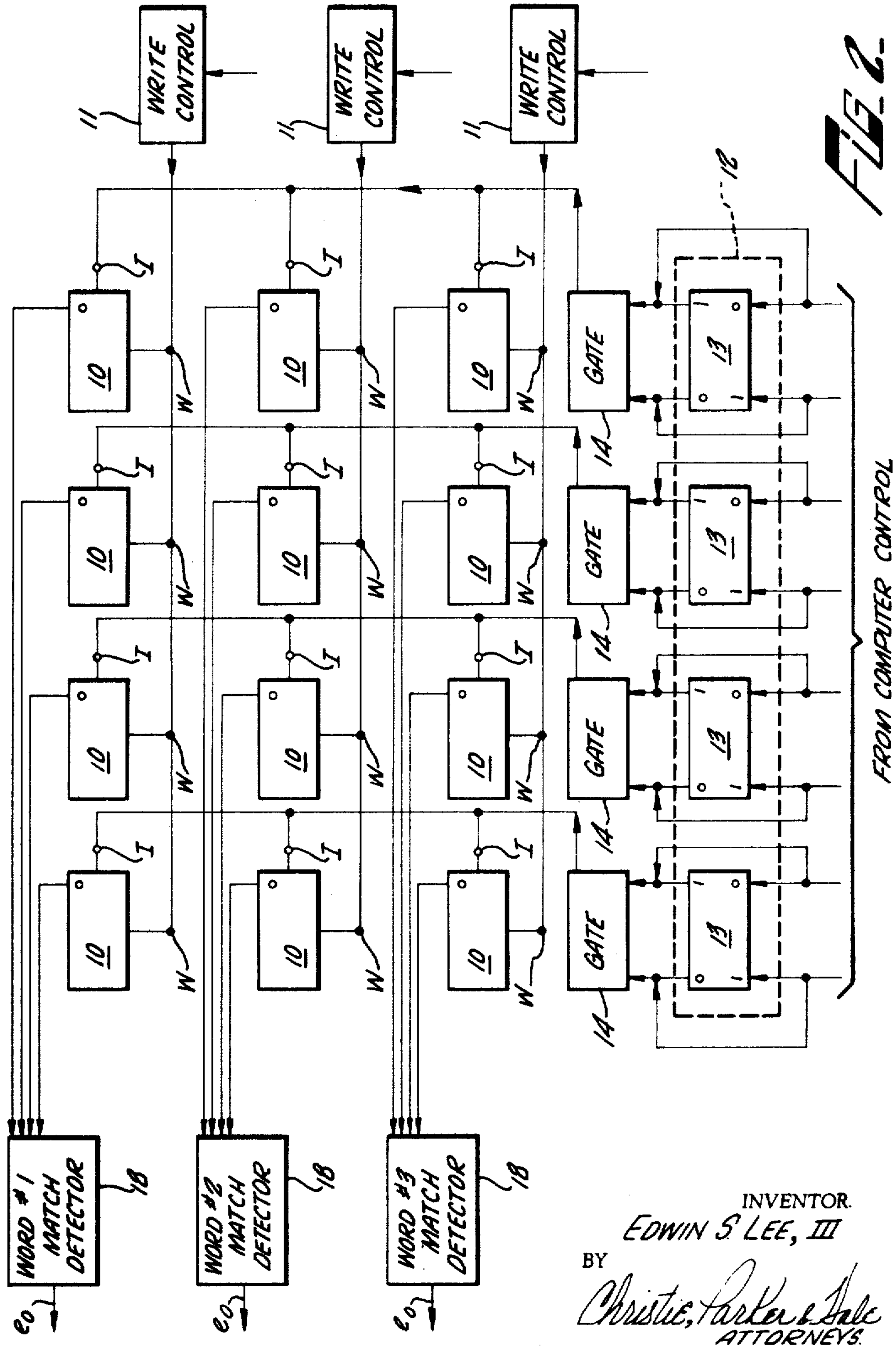

These and other features of the present invention may be more fully appreciated when considered in the light of the following specification and drawings, in which:

FIG. 1 is a block-circuit diagram of a comparison arrangement embodying the invention; and FIG. 2 is a block-circuit diagram of an associative memory system embodying the invention.

Now referring to FIG. 1, the structure embodying the basic associative comparison technique will be examined. The information to be compared is stored in associative cells 10 and which associative cells have bistable characteristics similar to the conventional flip-flop circuit. Accordingly, the alternate states of conduction of the associative cell 10 will be effective to store a binary one or a binary zero, as is well known. A further characteristic of the associative cell 10 is that it is provided with an input means or terminal that complements the state of the associative cell upon the reception of an input signal at this terminal. This complementing input terminal is identified by the reference letter I. The states of the associative cell 10 are indicated by the output circuits of the bistable element and, in this instance, only the output circuit corresponding to the binary zero is under consideration. This output terminal is identified by the reference numeral 0. In addition to the aforementioned terminals, the associative cell 10 is provided with a writing terminal W for writing new information into the corresponding associative cells. The associative cells 10 shown in FIG. 1 have the terminals W connected in parallel circuit relationship to a write control shown as the box 11.

The comparison register 12 comprises a plurality of comparison cells 13 which also may be conventional flip-flop circuits. The comparison cells 13 each have input circuits for placing the cells in the binary one or the binary zero state when an input signal is received at the corresponding one or zero input circuit and the conductive condition of the corresponding output circuits indicate or signal whether the comparison cell 13 is storing a binary one or a binary zero.

Coupled intermediate the associative cells 10 and the corresponding comparison cell 13 of the compare register 12 is an individual control gate 14. The control gates 14 are each coupled between the output circuits of an individual compare cell 13 and the input terminal I of the corresponding associative cell 10 storing a bit of the same binary significance to control the complementing of the associative cell 10. The control gate 14 comprises an OR gate 15 having its output terminal connected directly to the input terminal I of the corresponding associative cell 10 and two input circuits that are individually connected to the output circuits of a pair of AND gates 16 and 17. The input circuit for the AND gate 16 is connected to the binary zero output circuit of the corresponding compare cell 13 and also to receive the signal delivered to the one input terminal of this same compare cell 13. In the same fashion, the AND circuit 17 of the same control gate 14 is coupled directly to the one output circuit of the compare cell 13 and to simultaneously receive the signal for placing this same compare cell in the zero state.

The zero output terminal of the associative cells 10 are each individually coupled to a word match detector 18 for indicating the matching relationship between the words stored in the associative cells 10 and the words stored in the compare register 12. The signal that appears at the zero output terminal of an associative cell 10 is further identified as a "true" signal for indicating the matching relationship between the information recorded in the associative cell 10 and the corresponding bit stored in the comparison cell 13. This "true" signal is provided when an associative cell 10 is in the zero state and accordingly the zero output terminal will produce a "false" signal when the cell 10 is in the one state. Accordingly, when all the associative cells 10 signal a "true" state, the word match detector 18 will produce a "true" output signal at the terminal $e_0$ to indicate that the binary bits of the word stored in the associative cells 10 match the binary bits stored in the corresponding comparison cells 13. In the same fashion, if one of the binary bits mismatches, the one output terminal from the corresponding associative cell 10 will be "true" while the zero output terminal will be "false" and the word match detector 18 will produce a "false" signal at the output terminal $e_0$.

It will be assumed that initially the states of the associative cells 10 and the comparison cells 13 are arranged in a zero state. Accordingly, with the comparison cells 13 each in the zero state and the associative cells 10 in the zero state, the associative cells 10 will all produce a "true" output signal indicating a correct match between the unloaded associative cells and the unloaded comparison register.

Let it now be assumed that the write control 11 is energized to place the left hand associate cell 10 in the zero state and the right hand associative cell 10 in the one state, storing the word 0 1. It will be further assumed that at this same time the comparison register 12 is still storing a pair of binary zeroes or the word 0 0. It will be apparent that a mismatch will be indicated by the word match detector 18 as soon as the right hand associative cell 10 signals a "false" indication for that binary bit although the other associative cell 10 indicates a "true" output indication. This, then, will result in the correct "false" output indication at the terminal $e_0$.

Now assuming that the new word is written into the comparison register 12, the word 0 1, reading left to right. Stated differently, the binary bit zero will be written into the left hand comparison cell 13 through the application of a signal at its zero input terminal, while the binary one will be written into the right hand comparison cell 13 by means of a signal applied at the one input terminal of this cell 13. With the application of these two binary signals to the comparison cells 13, the control gates 14 need to be examined. The control gate 14 for the left hand comparison cell 13 will receive the binary zero signal substantially with the application of this signal to the zero input terminal of the corresponding comparison cell 13. This zero setting signal is received at the AND gate 17 in combination with the "false" output signal from the one output circuit of this same comparison cell 13. Accordingly, no "true" output signal will be produced from the AND gate 17 at this time. Since only the zero output terminal coupled to the AND gate 16 is energized, no "true" output signal from the AND gate 16 will be coupled to the OR gate 15 whereby the corresponding associative cell 10 will not receive a signal and therefore will not be complemented. This associative cell 10, then, will continue to indicate a matching condition with the corresponding compare cell 13. This is as may be expected since the binary state of the corresponding associative and comparison cells has never been changed from the initial states as a result of the loading of the associative and compare cells.

Referring to the right hand comparison cell 13 and which cell is loaded to switch it to the binary one state. This binary one signal is simultaneously applied to the AND gate 16 for the corresponding control gate 14 in combination with the "true" signal from the binary zero output circuit of the comparison cell 13. This "true" signal is in fact a "true" signal upon the arrival of the input signal at the gate 16 since the comparison cell 13 has not had sufficient time to switch to the one state. The occurrence of the two "true" signals at the AND gate 16, then, will produce a "true" output signal and which signal is coupled through the OR circuit 15 for complementing the corresponding associative cell 10. Since this associative cell 10 was previously in the binary one state, it will now be switched to the binary zero state and the zero terminal thereof will indicate a "true" or matching signal with the corresponding comparison cell 13. This complementing action is effected while the comparison cell 13 is being switched in state. This is necessarily true since the AND gates 16 and 17 and the control gate 14 are responsive to the state of the comparison cell 13 immediately prior to their new state and not after the states have been changed. It should now be apparent that with the comparison register 12 storing the word 0 1, it will match the word stored in the associative cells 10. This matching indication is produced by the two "true" output signals from the associative cells and, in turn, the "true" output signal produced at the $e_0$ terminal of the word match detector 18.

As mentioned hereinabove, the word actually stored in the associative cells 10 is 0 1, but the states of these cells now represent the word 0 0. At this interval the comparison cells 13 store the matching word 0 1. Accordingly, to determine the "true" word stored in the associative cells 10, it is necessary to refer to the state of the corresponding comparison cells 13. The only time that the storage state of an associative cell 10 represents the "true" state of the corresponding bit of the stored binary word is when the corresponding comparison cell 13 is in the zero state. When the corresponding cell of the comparison register is in the one state, the corresponding associative cell 10 has been complemented at least once and, accordingly, the actual bit represented by the state of the associative cell is the complement thereof. Once again, recalling that the word stored in the associative cells 10 is 0 0 and that the actual state represents the word 0 1, the application of the aforementioned rule will be seen to produce the correct matching word. This correct matching word results since the state of the left hand compare cell 13 is zero to indicate that the "true" state of the left hand associative cell 10 is zero, while the "true" state of the right hand associative cell 10 is one rather than the indicated zero since the right hand comparison cell has gone through a change in state from its initial state to a binary one state.

Assuming further that with the present states of the two associative cells 10 arranged in binary zero states, and further recalling that these states represent the word 0 1, reading from left to right, and that the word to be stored into the comparison register 12 is 1 0, reading from left to right, the state of the comparison register 12 immediately prior to the application of the new word will still be 0 1, reading left to right. Accordingly, examining the left hand comparison cell 13, providing a "true" zero signal, it will be seen that the binary one signal applied thereto will be coupled to the associated AND gate 16 in combination with the "true" signal from the zero output terminal of this comparison cell 13 and, in turn, a "true" signal is provided by the OR gate 15 resulting in the complementing of the left hand associative cell 10. The complementing of this associative cell 10 places it in the binary one state and, therefore, produces a "false" output signal. Upon the completion of the switching of the comparison cell 13 from its initial state into the new state or binary one state, it will be seen that a mismatch or false relationship does exist between the bit actually represented by the associative cell 10, the bit zero and the new state, binary one, of the comparison cell 13.

Now examining the right hand comparison cell 13, and to which cell a signal is applied to switch it to the zero state. However, prior to the switching of the state of the right hand comparison cell 13, the zero setting input signal applied thereto will be effective at the input of the AND gate 17 of the associated control gate 14 along with the "true" signal from the one output of this same comparison cell 13 to produce a complementing signal at the I terminal of the corresponding associative cell 10 to place this cell in the binary one state. Therefore, with the completion of the switching of the right hand comparison cell 13 to the zero state, the corresponding associative cell 10 will be providing a "false" output signal and, accordingly, with the two "false" signals applied to the word match detector 18 a "false" signal will appear at the output terminal $e_0$. It will be seen that this will be a correct output indication since the associative cells 10 store the word 0 1 although they indicate the binary signals 1 1, and the comparison cells store the word 1 0. Therefore, both bits mismatch and the mismatch of both bits is indicated by both associative cells 10 signaling a binary one or false state.

An important aspect of the logic of the associative comparison technique is that in comparing the binary bits stored in corresponding associative and comparison cells, it is necessary to complement an associative cell, first, when the comparison cell is switched from its initial state, assumed binary zero state, and secondly once a comparison cell has been switched from its initial state with each subsequent change in binary state thereafter. Although the actual word stored in a group of associative cells may not be recognized by referring to the output indications of the associative cell, the matching or mismatching characteristic of the associative word stored in the memory proper and the word in the comparison register may be immediately identified. The "true" word stored in a group of associative cells may be readily identified by referring to the relative states of the corresponding associative cells 10 and the comparison cell 13 to determine whether the indicated state of the associative cell should be complemented or not to derive the correct storage word, as described hereinabove.

Now referring to FIG. 2, an associative memory system embodying the invention will be described. The associative memory shown in FIG. 2 is arranged to accommodate three binary words of four binary bits each. The binary bits of each binary word are stored in an individual associative cell 10, as in the previous embodiment. The cells 10 comprising a binary word are arranged in the same row, with the bits of the same binary significance of each binary word arranged in the same column and connected to the corresponding comparison cell 13 of the comparison register 12. The words, as identified in FIG. 2, are stored with word number 1 stored in the uppermost row of associative cells 10, word number 2 is stored in the middle row, while the word number 3 is stored in the lowermost row. The control gates 14 are simply shown by means of a block bearing the reference numeral 14 and connected to the corresponding cell of the comparison register 12. The comparison register 12 comprises four comparison cells 13 of the type previously described.

The write control block 11 is shown connected to each of the W or write terminals of the associative cells 10. It should be noted that the techniques for writing into the associative cells 10 may be the same as that described in my earlier filed application mentioned hereinabove, bearing Ser. No. 236,310 and filed on Nov. 8, 1962, or any other convenient prior art technique. Of course, when the writing technique that I described in my earlier application is desired, it will be modified from that described in that earlier filed application in accordance with the associative comparison technique of this application.

Assuming that the words have been stored in the associative memory whereby the bits stored in the associative cells 10, reading from left to right, are as follows:

| | |
|---|---|
| Word 1 | 1 0 0 0 |
| Word 2 | 1 1 0 1 |
| Word 3 | 0 0 0 1 |

Initially, then, the comparison register 12 will have each of its comparison cells 13 in the zero state, word 0 0 0 0. It should be readily evident that since each word stored in the memory proper has at least one binary one, that at least one "false" signal will be applied to the word match detector 18 for each of the words 1, 2, and 3 and, accordingly, a "false" output will be indicated at each of the output terminals $e_0$ of the word match detectors 18.

With the same three words stored in the memory, let it be assumed that the comparison word is changed from the word 0 0 0 0 to the word 1 1 0 1. As discussed hereinabove, prior to the actual switching of the comparison cells 13 to indicate the new comparison word, the complementing action on the appropriate associative cells 10 will be effected. To this end, simultaneously with the application of the input signals to the comparison cells 13, these same signals will be applied to the gating circuits 14. Since a complementing operation will be effected at each associative cell 10 in which the comparison cells are switched from their initial binary state to the binary one state, it should be evident that beginning with the left hand comparison cell 13 each of the associative cells 10 arranged in the left hand column will be switched in state so that this column will indicate 0 0 1, reading from word 1 to word 3 respectively. In the same fashion, the next associative cell 13 also is switched in state and so the next column of associative cells 10 will indicate the binary bits 1 0 1 in reading from word 1 to word 3. Since the next comparison cell 13 is not switched, each of the corresponding associative cells 10 remain in their initial state and, therefore, continue to indicate the binary states 0 0 0. Then referring to the right hand comparison cell 12, it will be noted that this cell is switched in state and, accordingly, the corresponding associative cells will indicate the binary bits 1 0 0 in reading from word 1 to word 3.

TABLE I

| | Word in Memory | Word in Compare Register 12 | Comparison Output State of Associative Cells After New Compare Word Entered | Matching Indication |
|---|---|---|---|---|
| Word 1 | 1 0 0 0 | 1 1 0 1 | 0 1 0 1 | F |
| Word 2 | 1 1 0 1 | ---------- | 0 0 0 0 | T |
| Word 3 | 0 0 0 1 | ---------- | 1 1 0 0 | F |

By reference to Table I it will be noted that as a result of the application of the new word 1 1 0 1 to the comparison register 12 that the word indicated in row one will read, left to right, as 0 1 0 1, the associative cells 10 for word 2 will each be in the zero state, while the associative cells for word 3 will read 1 1 0 0 in reading from left to right. Since all the associative cells 10 for ward 2 are in the zero or "true" state, a match will be indicated between the comparison word now stored in the compare register 12 and word 2 in the memory. Although the associative cells 10 indicate the binary word 0 0 0 0, in fact they actually represent the matching word 1 1 0 1, as is indicated by Table I. This can be further verified by recalling the aforementioned rules with regard to the "true" storage state of the associative cells being derived by their relationship to the corresponding cell in the comparison register 13. This, then, will indicate that each cell corresponding to the comparison cell 13 has been complemented with the exception of one, namely the cell second from the right, and therefore each indicated state of the corresponding associative cells 10 can be "recomplemented" to obtain the actual state of the associative cells 10 to obtain the "true" stored word 1 1 0 1.

It will also be evident that although word 2 produces a matching output at the terminal $e_0$ for word 2 matching detector 18, that the other matching detectors for words 1 and 3 will produce "false" output signals, since two of the associative cells 10 for both words 1 and 2 have been switched into the binary one state and thereby cause the detectors 18 to each produce the "false" output signals.

It therefore should be evident that this invention has advanced the state of the art through the provision of a simple associative technique for comparing words stored in an associative memory with a word undergoing comparison whereby the comparison is effected and a word matching signal or mismatching signal will be available with the completion of the entry of the word undergoing comparison in the compare register 12.

What is claimed is:

1. A method of electronically comparing two pieces of information including the steps of writing one piece of information into a first binary storage cell providing binary output indications corresponding to the binary state of the cell, one of the binary states further indicating a matching relationship between said one piece of information and a piece of information undergoing comparison and the other binary state indicating a mismatching relationship, writing a piece of information to be compared into a second binary storage cell, and changing the binary state of the first cell only when the state of the second cell is changed whereby the indicated state of the first cell after the latter step is indicative of a match or mismatch between the two pieces of information undergoing comparison.

2. A method of electronically comparing two binary words comprising a plurality of binary bits including the steps of providing first and second binary registers for storing two pieces of information to be compared, the registers each storing the binary bits of the two words in individual cells and which cells each provide binary output indications of the states thereof and being arranged in one of the states, sequentially writing the two pieces of information to be compared into the first and second registers, changing the binary state of the individual cells of one of the registers only when the corresponding cell of the other register is changed from said one state and with each change in binary state thereafter in response to the writing of different binary bits, and examining the binary states of each of the cells of said one register to determine the matching characteristic of the two pieces of information and electrically indicating a match or mismatch.

3. A method of associatively comparing binary words with a word undergoing comparison, providing a plurality of storage registers for storing a corresponding plurality of binary words, each storage register comprising individual binary registers for storing the individual binary bits of the words, arranging the individual binary registers in rows and columns whereby the same binary bit of each word is in the same column and the binary bits of a single word are arranged in the same row, writing binary words into a plurality of storage registers, providing a comparison register having individual registers for receiving the binary bits of a binary word to be compared, changing the binary state of each binary register for each binary word for the binary bits corresponding to the binary bits of the word of the comparison register undergoing comparison when the bit registers thereof are to be changed in state, and examining the binary bit registers for each word to determine the matching words and electrically indicating a matching word.

4. In an associative memory system comprising an associative memory cell having two storage states and switchable therebetween and including input means for complementing the storage state thereof, a comparison register having at least a single storage element switchable between two storage states and providing an indication of the storage state thereof, control means connected to be responsive to the indication of the comparison element and to the input means of the memory cell, and signal input means coupled to the comparison cell and to the control means to cause the associative cell to be complemented only when the storage state of the comparison cell is different than the signal received at the input means whereby the resulting state of the associative memory cell immediately signals the matching or mismatching relationship between the states of the memory cell and the comparison cell.

5. In an associative memory system including a plurality of associative memory cells arranged in rows and columns, the cells being further arranged with the corresponding bits of the stored words arranged in the same column, the associative memory cells being characterized as having input means for switching the memory cells from one binary state to the other binary state upon the reception of a signal thereat, a compare register having a plurality of compare cells for storing the bits of a word to be compared, individual control means coupled between the compare cells and each of the input means of the corresponding memory cells, and means for receiving input signals representative of the bits of a word to be compared to the compare cells for storage therein and coupled to the corresponding control means, the control means being effective to provide a signal at the input means of the associative cells arranged in the same column only when the received input signal will change the binary state of the associated compare cell.

6. In an associative memory system as defined in claim 5 wherein individual control means comprise a gating network responsive to the state of the corresponding compare cell prior to any change produced by a signal received by the compare cell in combination with said signal to provide a signal to the associated cells only when the compare cell state is to be changed.

7. In an associative memory system as defined in claim 6 wherein the compare cells provide static indications of the binary storage state thereof and the gating network includes a pair of AND circuits coupled to an individual static indication and the signal for changing the state of the compare cell to the opposite state.

8. In an associative memory system including a plurality of associative memory cells arranged in rows and columns, the cells being further arranged with the corresponding bits of the stored words arranged in the same column, the associative memory cells being characterized as having input means for switching the memory cells from one binary state to the other binary state upon the reception of a signal thereat, a compare register having a plurality of compare cells for storing the bits of a word to be compared, individual control means coupled between the compare cells and each of the input means of the corresponding memory cells, means for receiving input signals representative of the bits of a word to be compared to the compare cells for storage therein and coupled to the corresponding control means, the control means being effective to provide a signal at the input means of the associative cells arranged in the same column only when the received input signal will change the binary state of the associated compare cell, and means coupled to each associative cell comprising a binary word for examining the binary state thereof to determine and signal the matching relationship with the word stored in the compare register.

9. In an associative memory system including a plurality of associative memory cells arranged in a preselected pattern for storing the individual bits of binary words, the memory cells comprising bistable elements providing output indications of the storage state thereof and having an input means for switching the storage state of the elements upon the reception of a signal thereat, a compare register having a plurality of bistable elements for storing the binary bits of a binary word to be compared with the words in the memory cells, bit by bit, each of the compare elements providing output indications of the storage state thereof, and control means coupled to be responsive to the output indications from each of the compare elements and signals representative of the binary bits of a new binary word to be entered into the compare register and to the input means for each of the associative cells storing binary bits of the same binary significance for each binary word for changing the binary states of the associative cells when the states of the corresponding compare elements are to be changed by the new word to be stored in the compare register whereby the matching or mismatching relationship of the words stored in the associative cells and the compare register are indicated by the resulting states of the associative cells upon the completed entry of the new word in the compare register.

10. In an associative memory system as defined in claim 9 wherein the associative memory cells provide static output indications of their binary storage states, one of the states being selected to represent a matching relationship with the corresponding bit stored in the compare elements of the compare register and the other state signaling a mismatching relationship, and individual detector means coupled to be responsive to said one output indication for each associative cell comprising a binary word for signaling a matching or mismatching relationship between the word stored in the compare register and the words stored in the associative cells.

11. In an associative memory system as defined in claim 10 wherein said compare elements provide static output indications of their binary states and said control means comprises individual gating means coupled to a separate compare element and the corresponding associative cells for examining the present state of the compare element and the new state for complementing the states of the coupled associative cells when the state of the compare element is to be changed by the new bit stored therein.

References Cited

UNITED STATES PATENTS 3,093,814 6/1963 Wagner et al. ------- 340—172.5

PAUL J. HENON, *Primary Examiner.*

R. ZACHE, *Assistant Examiner.*